United States Patent [19]

Peronnet

[11] 4,303,949
[45] Dec. 1, 1981

[54] MAGNETIC RECORDING DEVICE FOR PROVIDING SECURITY RELATED INFORMATION

[75] Inventor: Roland Peronnet, Creteil, France

[73] Assignee: Societe Pyral, Creteil, France

[21] Appl. No.: 62,426

[22] Filed: Jul. 31, 1979

[30] Foreign Application Priority Data

Aug. 1, 1978 [FR] France .............................. 78 22667

[51] Int. Cl.³ ............................................ G11B 25/04
[52] U.S. Cl. ...................................... 360/2; 235/493
[58] Field of Search ................... 360/2; 235/493, 450, 235/449

[56] References Cited

U.S. PATENT DOCUMENTS

| | | | |
|---|---|---|---|
| 3,599,153 | 8/1971 | Lewis et al. | 235/493 |
| 3,613,101 | 10/1971 | Leonard et al. | 235/493 |
| 3,935,361 | 1/1976 | Dortman | 428/189 |
| 4,081,132 | 3/1978 | Pearce | 235/450 |
| 4,090,662 | 5/1978 | Fayling | 360/2 |

FOREIGN PATENT DOCUMENTS 7040678 8/1971 France .
1212502 11/1970 United Kingdom .
1516832 7/1978 United Kingdom .

OTHER PUBLICATIONS

"Magnetic Printing Process"-Leveque, IBM, TDB, vol. 12, #2, 7/69.

*Primary Examiner*—Vincent P. Canney
*Attorney, Agent, or Firm*—Sherman & Shalloway

[57] ABSTRACT

A magnetic recording device for providing security related information includes a magnetic base carrier having substantially uniform thickness and zone of increased or decreased thickness on the base carrier forming thickness increments. The thickness increments impart different magnetic characteristics to the recording device to amplitude modulate a magnetic signal recorded thereon and thereby provide security related information. Processes for the preparation and application of such a device are also disclosed.

13 Claims, 7 Drawing Figures

SECTION AA

MAGNETIC RECORDING DEVICE FOR PROVIDING SECURITY RELATED INFORMATION

BACKGROUND OF THE INVENTION

1. Field of the Invention

The present invention relates to a magnetic recording device for providing security related information. The present invention also relates to processes for the preparation of such a device and a process for the application of the device in association with an object to be identified.

The storage of information on a magnetic recording carrier in a coded format and the identification of an object bearing the magnetic carrier, through reading the information on the carrier, are known. It is conventional to use magnetic carriers containing coded information for the identification of such objects as credit cards, payment tickets, financial papers, cards for gaining access to certain geographic locations and cards for gaining access to a place during a certain period of time, for example.

A magnetic recording carrier of this type can consist of a film of a resinous material comprising individual grains of magnetic particles, for example acicular, i.e., needlelike, particles of gamma $Fe_2O_3$ or any other magnetized particle. Such carriers are generally prepared from a suspension of the component grains in a solution with a solvent of resinous binder. The solution is coated on a magnetically inert carrier in the form of a film by conventional means. Following evaporation of the solvent, a film of the magnetic product of magnetizable grains and resin, having a substantially constant thickness, remains on the carrier. The magnetizable grains can have either a random orientation or a predetermined orientation which is established prior to the evaporation of the solvent.

A magnetic carrier formed in this manner can then be placed on the object to be identified or personalized and coded magnetic information is recorded on the carrier by means of known devices. For example, the recording can be carried out by means of directional pulses. Thereafter, by reading this recorded information in a magnetic decoding device, it is possible to compare the information stored in the carrier with a reference signal and determine whether the object bearing the information conforms with an object which is anticipated. Due to the relative ease with which the coded information can be read from the carrier, this system for identifying objects is susceptible to forgeries. The forgeries can be accomplished merely be reproducing the coded information on a virgin magnetic recording carrier, such as one manufactured in the manner described previously, after reading the information from the bearer object.

2. Description of the Prior Art

One proposed solution for eliminating forgeries consists of preorienting the acicular grains in predetermined zones by means of pulses which are applied after the coating of the suspension during the manufacture of the magnetizable carrier. This orientation of the grains results in the creation of zones in the magnetizable carrier which exhibit physically undetectable differences in remanence, i.e., residual magnetism. A signal which is recorded on such a carrier produces a response in a magnetic reader which cannot be reproduced on an ordinary carrier. After reading the signal recorded on the carrier, the signal is erased by the reader mechanism, and is therefore not susceptible of being copied on an ordinary carrier, in view of the difference in remanence between the genuine carrier and a forged carrier.

The inhibition of forgery through this technique has a disadvantage in that it requires skilled operations to preorient the magnetizable grains in a desired pattern, and therefore increases the cost of the manufacture of the information carrier.

OBJECTS AND BRIEF SUMMARY OF THE INVENTION

It is therefore a general object of the present invention to provide a novel magnetic recording device, for storing security related information, which is not capable of being easily forged.

It is another object of the present invention to provide a novel magnetic recording device of the type described which can be manufactured in a simple and economical manner.

It is a further object of the present invention to provide a novel method for the preparation of such a recording device.

It is yet another object of the present invention to provide a novel method of application of the recording device in association with an object to be identified.

In accordance with the present invention, these, as well as other objects and advantages, are attained by providing a magnetizable carrier in the form of an elongated film, such as a tape comprising a thermoplastic resin matrix and magnetizable grains, with a predetermined increase or decrease in thickness, hereinafter referred to as a thickness increment, in certain predetermined or randomly selected zones. After recording a signal on such a carrier, the corresponding signal read therefrom will be amplitude modulated by a value greater than that obtained as the result of the slight thickness variations resulting from the manufacture of prior art carriers. This amplitude modulation of the reader signal can be readily transformed into a code corresponding to the variations of the thickness of the magnetic carrier.

The thickness increments of the magnetic recording carrier of the present invention may be of any form and at any location on the carrier. In a preferred embodiment, they may be present in the form of elongated zones extending in the transverse direction or the longitudinal direction on the magnetic base carrier, these zones preferably being in the form of rodlets or traces. The distribution of the thickness increments on the magnetic base carrier can be random or it may be the result of a planned configuration of increments which is predetermined prior to carrying out the processes for manufacturing the object to be identified by the carrier.

The thickness increments which are located on the magnetic base carrier should be greater than 40% of the nominal thickness of the magnetic base carrier, to avoid confusion with the thickness variations which are obtained during the normal manufacture of a prior art carrier. These normal thickness variations which are due to manufacturing tolerances generally do not exceed more than 10% of the nominal thickness of the carrier.

As an illustrative example, for a magnetic base carrier of conventional commercial manufacture having a nominal thickness of 10 microns, the thickness increments of the invention would be more than 4 microns. In this example, for intentional variations of thickness increments of less than 4 microns, the variation of the reader signal cannot be distinguished from resultant accidental alterations, taking into account the alterations of the reader signal due to either manufacturing thickness variations of the magnetic carrier or defects in the contact of the carrier with the recording and reader heads, and consequently no security related information will be furnished.

The upper limit of the thickness increments on the magnetic carrier is not critical. However, in actual practice, the increments in general do not exceed 200% of the thickness of the magnetic carrier. This value should not be construed as a limitation on the thickness of the increments, however.

The magnetic characteristics of the thickness increments on the magnetic recording carrier may be identical with or different from those of the magnetic base carrier. For example, the coercivities, i.e. magnetic saturation point, of the thickness increments and base carrier may be identical or different. In particular, the increments may be different in the sense that they contain magnetizable particles with a different chemical composition or a different form and structure. In addition, the increments and/or the magnetic carrier can be exposed to different magnetic orientations at the respective moments of their manufacture. They may similarly differ in their respective amounts of magnetic particles per unit volume. Thus, for example, the magnetic base carrier may contain magnetizable particles of any shape, while the increments may contain acicular particles, or vice versa. Similarly, the magnetic base carrier may comprise acicular magnetic particles oriented during manufacture in one predetermined direction and the magnetic carrier of the thickness increments may comprise acicular magnetic particles oriented in a direction other than the direction of orientation of the base carrier particles.

The various thickness increments disposed on the magnetic recording carrier may be uniform in thickness or they may be different, provided that they are each greater than 40% of the thickness of the magnetic base carrier.

The magnetic recording carrier of the invention preferably comprises one or more nonmagnetizable matrices containing a generally "heat bondable" resin composition, and possibly a plasticizer, encasing well-known magnetizable particles, such as particles of $\gamma$-$Fe_2O_3$, $CrO_3$ chromium oxide, iron oxide doped with cobalt, cobalt-chromium alloys, etc. The particles may be of any particular shape, or they may be acicular. In cases wherein the resin composition constituting the matrix of the magnetic carrier is not "heat bondable", the magnetic recording carrier of the invention will have an additional outer layer of a "heat bondable" material to cover the magnetic recording carrier. For example, this type of structure may be used in the case of a resin composition comprising a resinous binder and a cross-linking agent of said binder and yielding a non-heat bondable, cross-linked matrix after the evaporation of the solvent of the initial composition, or, alternatively, after the heat treatment. In another embodiment of the case of a non-heat bondable matrix of the magnetic carrier, the object intended to receive the magnetic recording carrier can carry a heat bondable layer at the intended location of the magnetic carrier.

The expression "heat bondable" as used hereinabove is defined as a resinous composition capable of being plasticized by means of heat and adhering by contact in the molten state and under pressure to an appropriate support, the cohesion being attained after cooling. Consequently, the expression accounts for the relationship existing between the resinous composition constituting the matrix of the magnetic carrier and a given support. As illustrative examples of compositions forming pairs of a heat bondable composition and a carrier, the following may be mentioned: polyvinyl butyral resin and paper, thermoplastic polyurethane resin and polyvinyl chloride. It should be understood that it is possible for one skilled in the art to conceive of other such pairs as a function of the support intended to receive the magnetic recording carrier by selecting a heat bondable composition from among those commercially available. Also, heat bonding may result from cold adhesion after melting and hot contact of the object and the magnetic carrier due to the compatible chemical nature of the object to be identified and the magnetic carrier, or it may be the result of a physical treatment of the carrier, for example abrasion, in order to increase the surface conditions for adhesion.

BRIEF DESCRIPTION OF THE DRAWINGS

To facilitate a better understanding of the invention, preferred embodiments thereof will be described with reference to the accompanying drawings, in which.

DETAILED DESCRIPTION OF THE PREFERRED EMBODIMENTS

Figure 1:
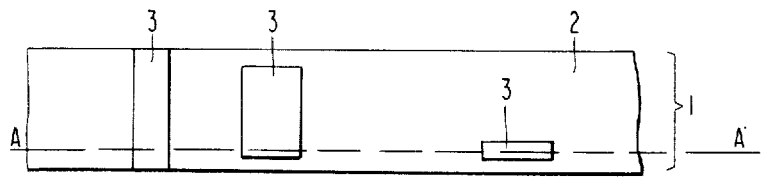
FIG. 1 is a front view of a magnetic recording carrier constructed in accordance with the present invention.
Figure 1A:
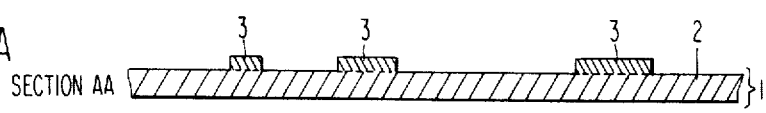
FIG. 1A is a sectional view of the magnetic recording carrier illustrated in FIG. 1, taken along the section line A—A of FIG. 1.

Referring now to FIGS. 1 and 1A, a magnetic recording carrier 1 comprises a magnetic recording base carrier 2 having a substantially constant thickness and being of a generally elongated configuration, such as a tape. The magnetic base carrier 2 can be comprised of a resin matrix, as defined previously, containing magnetizable particles. Thickness increments 3 are positioned integrally on the upper face of the base carrier 2. These increments are represented for the sake of simplicity as rectangular zones extending in the transverse and longitudinal directions of the base carrier 2, but it should be understood that these thickness increments may be present in different configurations and orientations other than those illustrated.

For example, the thickness increments 3 may constitute a graphical lettered symbol or numeral, or a symbolic graphical representation constituting a thickness code. Similarly, the thickness increments 3 may have different thicknesses, provided that they satisfy the minimum thickness condition described previously. Furthermore, as mentioned previously, the magnetic characteristics of the base carrier 2 and the thickness increments 3 may be identical or different.

Figure 2:
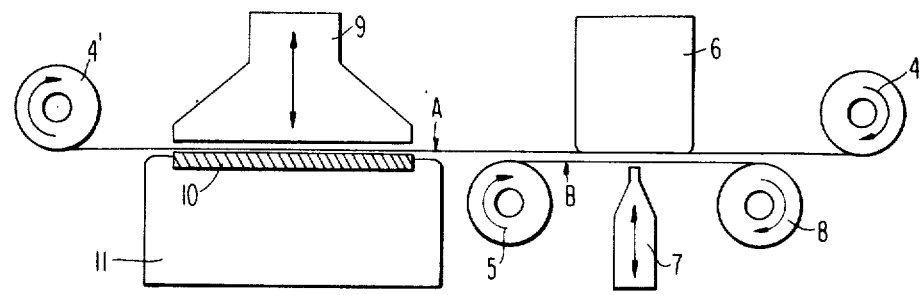
FIG. 2 is a schematic diagram of a method for the preparation of a magnetic recording carrier constructed in accordance with the present invention.

Referring now to FIG. 2, one embodiment of a process for the preparation of a magnetic carrier in accordance with the present invention is illustrated schematically, together with apparatus for carrying out the process. A transfer tape A is wound in the form of a coil 4. This tape is of conventional construction and can consist of a mechanically strong film carrying a known magnetic carrier having a substantially constant thickness and magnetic properties identical with those of the magnetic base carrier 2 of FIG. 1. The transfer tape is prepared by conventional coating and drying processes. A second transfer tape B is also wound in the form of a coil 5. This transfer tape is also of conventional construction and can be prepared in the same manner as the transfer tape A by a known process. This second transfer tape has thickness and magnetic properties corresponding to those of the thickness increments 3 in FIG. 1.

The resin matrices constituting the magnetic carriers of the transfer tapes A and B are generally heat bonding as defined previously. Alternatively, the transfer tapes A and B may carry a layer of a heat bondable material. The two transfer tapes A and B move in opposite directions, as indicated by the arrows in FIG. 2, and have adjacent opposing surfaces. The respective magnetic carriers are located in front of a transfer device comprising a table 6 and a hammer 7. The hammer 7 is heated to a temperature at which the layer of the magnetic carrier of the transfer tape B, or the heat bondable layer located on the magnetic carrier of the transfer tape B, softens and may be transferred, by contact under the pressure of the hammer, to the transfer tape A. The surface of the tool at the end of the hammer 7 corresponds to the thickness increment zone that is to be applied to the magnetic base carrier of the transfer tape A. The hammer 7 moves both in the vertical direction, to contact the tape A and the tape B with each other on the table 6, and in the horizontal direction along the table 6 by conventional mechanical means (not shown) which may be controlled to obtain a given configuration of the thickness increments. The hammer may further be moved in the rotation in the horizontal plane to selectively effect transfer in the longitudinal or transverse direction to the transfer tape A.

Figure 2A:
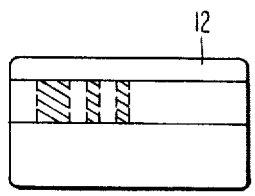
FIG. 2A is a front view of an object to be identified having a magnetic recording carrier applied thereto.

In order to prepare a magnetic recording carrier in accordance with the present invention and apply the carrier to an object to be identified, two new transfer tapes A and B are placed adjacent to the table 6 and positioned by unwinding the tapes from the coils 4 and 5. The heated hammer 7 is set into motion vertically and transfers to the transfer tape A the desired zones of thickness increments from the magnetic carrier of the transfer tape B. By moving to successive, controlled positions in front of the table 6, the hammer 7 provides the desired configuration of the thickness increments. Following the completion of the transfer operation, the used portion of the transfer tape B is wound by rotation onto a take-up reel 8, and a new portion, coming from the supply reel 5, is positioned adjacent to the table 6 for a subsequent transfer operation. The portion of the transfer tape A which received the thickness increments is moved by means of the rotation of the reels 4 and 4' adjacent an object 10, located on a support 11, to which the magnetic element of the transfer tape A is to be applied. A heated hammer 9, moving vertically and having a head corresponding in size and shape to the element to be applied, then applies the transfer tape to the object to be treated. Under the combined effect of temperature and pressure, the magnetic portion of the tape A is transferred to the object. In this manner, it is possible to obtain an object 12 which can be identified by means of a magnetic carrier integrally positioned thereon (FIG. 2A).

The manufacturing process and apparatus described with regard to FIG. 2 can include variations as a function of the configuration and the magnetic characteristics of the thickness increments on the magnetic carrier. For example, the transfer tool on the head of the heated hammer 7 can be formed as a complete or partial configuration of the total configuration of the thickness increment to be transferred to the first transfer tape A. In a different case wherein the thickness increments must have different thicknesses or different magnetic properties, the apparatus can include as many transfer devices as there are types of thickness increments or it can comprise as many reeling systems 5, 8, successively positioned adjacent to the table 6, as there are thickness increments to be applied.

Figure 3:
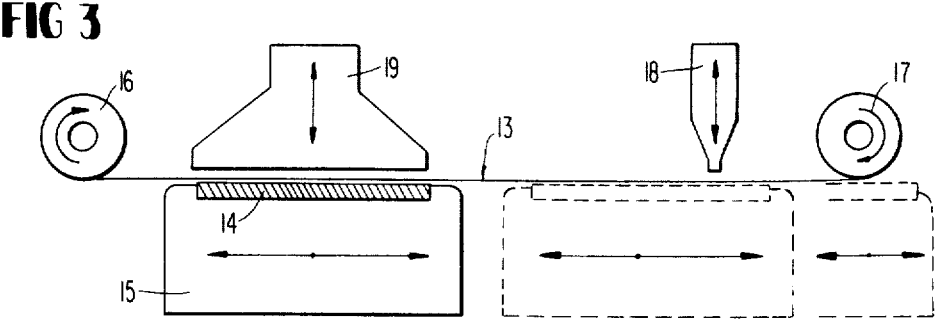
FIG. 3 is a schematic diagram of a process for the preparation of a magnetic recording device directly on the object to be identified.
Figure 3A:
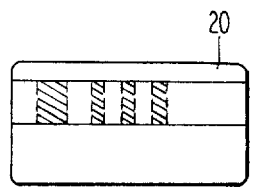
FIGS. 3A and 3B are front views of the object to be identified at the completion of and at an intermediate step during the preparation of the recording device.
Figure 3B:
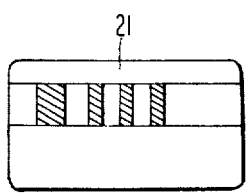

Referring now to FIG. 3, a second embodiment of the process for manufacturing the magnetic carrier is illustrated, wherein the carrier is prepared in situ on the object to be identified. A transfer tape 13, of the type described herein in regard to FIG. 2, is wound on a reel 17. The object 14 intended to receive the magnetic carrier moves in the horizontal direction from right to left on an object carrier 15. In a first step of the manufacturing operation, the thickness increments of the magnetic carrier are applied to the object 14 by placing the object carrier 15 at a transfer station comprising a heated hammer 18 similar to the hammer 7 of FIG. 2. By moving the object carrier 15 relative to the stationary hammer 18, the thickness increments are transferred to the object from an unused portion of the transfer tape 13 in a preestablished configuration, to obtain an object 21 carrying the thickness increments (FIG. 3B). The object carrier 15 is then moved adjacent to a heated hammer 19 similar to the hammer 9 of FIG. 2. The transfer tape 13 is moved so that the portion of the transfer tape placed under the hammer 19 is different from the portion used in the preceding transfer of the thickness increments. By a vertical movement of the hammer 19, the transfer tape 13 is applied to the location of the object carrying the thickness increments. Under the effect of pressure and heat, the magnetic portion of the tape is transferred to the object 14 to be identified. In this manner, an object 20 (FIG. 3A) having a magnetic recording security carrier constructed in accordance with the present invention can be obtained.

Following the application of the magnetic recording carrier to the object to be identified, the object, if desired, may be covered with a protective film. After this, the surface can be treated by a known process, such as laminating.

It will be appreciated that the previously described process and apparatus may comprise numerous variations. For example, in a case wherein the magnetic base carrier differs in thickness and in magnetic properties from those of the thickness increments, the process can include a first transfer station for the transfer of a first set of thickness increments by means of a first transfer tape, and a second transfer station for the transfer of the magnetic base carrier from a tape different from the first transfer tape 13, said second station being independent of the first. These operations may be effected simultaneously, subsequently to each other, or on different equipment.

It should further be understood that different devices may replace the hammers described hereinabove. For example, heating cylinders equipped with relief imprints, corresponding to the thickness increment zones desired, may be used. The control of the movement of the hammer 18 or of the table 15 may be effected by means of manual devices, automatic equipment or by using improved electronic control gear.

In the preceding description, an object comprising a magnetic carrier has been described wherein the thickness increments are positioned between the object and the magnetic base carrier. It will be appreciated that an inverse arrangement of the thickness increments and base carrier wherein the magnetic carrier is attached to the object, with the thickness increments on the outside, is also within the scope of the invention. With this arrangement, the manufacture of an object to be identified comprises the transfer of the thickness increments to a magnetic base carrier already positioned in the object to be identified by means of a transfer tape with a heated hammer. This step can be followed, if desired, by a finishing operation, such as lamination, for example.

The magnetic carrier of the present invention has thickness increments with low absolute thickness values, preferably positioned between the object to be identified and the magnetic base support, so that the increments are not physically detectable and do not cause undesirable perturbations in the physical contact of the carrier in a recording or reader apparatus. The detection and the physical forging of such a carrier is difficult and practically requires the destruction of the carrier and the genuine object. Similarly, knowledge of the geometric configuration of the thickness increments, i.e., their thickness and/or their positions, is not sufficient to reproduce the magnetic carrier of the invention, because it is also necessary to know the respective magnetic characteristics of the increments in relation to the magnetic base carrier.

According to another embodiment for the preparation of the magnetic carrier of the invention, the increments are created by the removal of magnetic material from a transfer tape having a maximum thickness corresponding to the maximum thickness of the magnetic carrier desired. This removal can be performed by means of a known process, such as localized abrasion. The resulting magnetic support is then positioned on the object to be identified, as described previously.

In order to illustrate the advantages presented by the magnetic recording carrier of the present invention, a specific application shall now be described with reference to a credit card. This application is provided for the purpose of illustration and is not intended to be limiting in scope. A credit card is equipped with a magnetic recording carrier, prepared as described previously. The card is delivered to its addressee without any magnetic information stored thereon.

To authenticate the card during a credit transaction, the card is fed into a reader device comprising a recording head, a reader head and an erasing head. The reader can optionally also include a second erasing head located upstream of the recording head to erase any information which may be initially present on the card. By passing the card in front of the recording head, the magnetic carrier is exposed to a variable, unidirectional magnetic field having a flux density value between the saturation value of the magnetic base carrier and the saturation value of the zones comprising the thickness increments. Afterwards, by means of the reader head, a signal is received which has a lesser amplitude over the zones of the magnetic base support than the signal read over the zones comprising the thickness increments. Consequently, a prior art magnetic recording carrier of uniform thickness will yield a reading signal different from that provided by the magnetic carrier of the present invention, regardless of the thickness of the prior art carrier.

It is thus possible to distinguish an authentic card from a forged one by magnetic means. An authentic card, having been recognized as such, passes by the erasing head wherein the recorded signal is erased, so that outside the control device it is not possible to reconstruct the magnetic configuration of the card.

The present invention may be embodied in other specific forms without departing from the spirit or essential characteristics thereof. The presently disclosed embodiments are therefore considered in all respects as illustrative and not restrictive. The scope of the invention is indicated by the appended claims rather than the foregoing description, and all changes which come within the meaning and range of equivalency of the claims are therefore intended to be embraced therein.

What is claimed is:

1. A magnetic recording device for providing security related information in a manner which inhibits forgery of the information; comprising:
    a magnetic recording base carrier in the form of a tape having substantially uniform thickness; and
    a plurality of thickness increments, each having the same coercivity as said magnetic recording base carrier, forming zones on the magnetic recording carrier in which the thickness of the recording device differs from the average uniform thickness of the base carrier by an amount greater than 40% of the average uniform thickness of the base carrier, to thereby impart different magnetic properties to the recording device in the areas of said zones.

2. A magnetic recording device as defined in claim 1, wherein said thickness increments are distributed randomly on one surface of said base carrier tape.

3. A magnetic recording device as defined in claim 1, wherein said thickness increments are arranged in the form of elongated zones extending in at least one of the transverse and the longitudinal direction of the base carrier tape.

4. A magnetic recording device as defined in claim 1, wherein said thickness increments are arranged in a predetermined pattern so as to constitute a security related code.

5. A magnetic recording device as defined in claim 1, wherein each of said thickness increments are of equal thickness.

6. A magnetic recording device as defined in claim 1, wherein different ones of said thickness increments have different thicknesses.

7. A magnetic recording device as defined in claim 1, wherein each of said magnetic base carrier and said thickness increments include magnetic particles, and the magnetic particles of the magnetic base carrier and of the thickness increments are identical.

8. A magnetic recording device as defined in claim 7 wherein said magnetic particles are acicular particles of $\gamma\text{-}Fe_2O_3$ which are oriented in different directions.

9. A magnetic recording device as defined in claim 1 wherein each of said magnetic base carrier and said thickness increments include magnetic particles, and the magnetic particles of said base carrier are different in physical structure than the magnetic particles of the thickness increments.

10. A magnetic recording device as defined in claim 9, wherein the magnetic particles of the magnetic base carrier are different in chemical nature from the magnetic particles of the thickness increments.

11. A magnetic recording device as defined in claim 1 wherein the thickness increments are disposed along the transverse direction of the tape and have a length that is a fraction of the length of the tape.

12. A magnetic recording device as defined in claim 1 wherein at least one of said base carrier and said thickness increments include matrices encasing magnetic particles, and wherein said matrices are formed of heat bondable materials.

13. A magnetic recording device as defined in claim 1, wherein said base carrier and said thickness increments include matrices which are not heat bondable and wherein the base carrier and the thickness increments are each coated with a layer of a heat bondable material.

* * * * *